US011648528B2

(12) United States Patent
Doughty et al.

(10) Patent No.: US 11,648,528 B2
(45) Date of Patent: *May 16, 2023

(54) CARBON SORBENTS FOR THE REMOVAL OF NITROGEN OXIDES AND METHODS FOR MAKING THE SAME

(71) Applicant: CALGON CARBON CORPORATION, MoonTownship, PA (US)

(72) Inventors: David T. Doughty, Moon Township, PA (US); Gina L. McNamara, Monongahela, PA (US)

(73) Assignee: CALGON CARBON CORPORATION, Moon Township, PA (US)

( * ) Notice: Subject to any disclaimer, the term of this patent is extended or adjusted under 35 U.S.C. 154(b) by 142 days.

This patent is subject to a terminal disclaimer.

(21) Appl. No.: 16/356,640

(22) Filed: Mar. 18, 2019

(65) Prior Publication Data

US 2019/0210001 A1 Jul. 11, 2019

Related U.S. Application Data

(63) Continuation of application No. 14/992,554, filed on Jan. 11, 2016, now Pat. No. 10,279,333.

(60) Provisional application No. 62/101,622, filed on Jan. 9, 2015.

(51) Int. Cl.
| | |
|---|---|
| B01J 20/22 | (2006.01) |
| B01J 20/06 | (2006.01) |
| B01J 20/08 | (2006.01) |
| B01J 20/14 | (2006.01) |
| B01J 20/20 | (2006.01) |
| B01J 20/32 | (2006.01) |
| B01J 20/10 | (2006.01) |
| B01J 20/28 | (2006.01) |
| B01D 53/02 | (2006.01) |

(52) U.S. Cl.
CPC ............ *B01J 20/22* (2013.01); *B01D 53/025* (2013.01); *B01J 20/06* (2013.01); *B01J 20/08* (2013.01); *B01J 20/103* (2013.01); *B01J 20/14* (2013.01); *B01J 20/20* (2013.01); *B01J 20/28052* (2013.01); *B01J 20/3204* (2013.01); *B01J 20/3236* (2013.01); *B01J 20/3248* (2013.01); *B01D 2253/25* (2013.01); *B01D 2257/204* (2013.01); *B01D 2257/2064* (2013.01); *B01D 2257/302* (2013.01); *B01D 2257/40* (2013.01); *B01D 2257/404* (2013.01); *B01D 2257/406* (2013.01); *B01D 2220/42* (2013.01)

(58) Field of Classification Search
CPC ... B01D 2253/25; B01J 20/3236; Y02A 50/20
See application file for complete search history.

(56) References Cited

U.S. PATENT DOCUMENTS

| | | | | |
|---|---|---|---|---|
| 4,801,311 | A * | 1/1989 | Tolles .................... | A62B 23/00 422/122 |
| 5,063,196 | A * | 11/1991 | Doughty ............... | B01D 53/02 423/240 R |
| 5,492,882 | A * | 2/1996 | Doughty ............... | A62B 23/00 128/205.27 |
| 6,344,071 | B1 * | 2/2002 | Smith .................... | B01D 53/02 502/401 |
| 7,004,990 | B2 | 2/2006 | Brey et al. | |
| 10,279,333 | B2 * | 5/2019 | Doughty .............. | B01J 20/3236 |
| 10,625,104 | B2 * | 4/2020 | Bischof .................... | B01J 20/20 |
| 2002/0166811 | A1 * | 11/2002 | Walker ............... | B01D 46/0024 210/455 |
| 2004/0259729 | A1 * | 12/2004 | Kaiser .................. | B01J 20/0244 502/417 |
| 2005/0155665 | A1 * | 7/2005 | Schlacchter ......... | B01D 39/202 141/12 |
| 2005/0160911 | A1 * | 7/2005 | Friday ................ | B01D 39/2062 96/134 |
| 2007/0087444 | A1 * | 4/2007 | England ............... | G01N 31/224 436/166 |
| 2012/0121471 | A1 * | 5/2012 | Nassivera ............... | A61L 9/048 422/122 |
| 2016/0166970 | A1 * | 6/2016 | Boehringer ............ | B01J 20/226 423/210 |
| 2016/0236169 | A1 * | 8/2016 | Doughty .............. | B01J 20/3204 |
| 2017/0173372 | A1 * | 6/2017 | Bischof .................... | B01J 20/20 |
| 2019/0210001 | A1 * | 7/2019 | Doughty .............. | B01J 20/3248 |

FOREIGN PATENT DOCUMENTS

| | | |
|---|---|---|
| EP | 0405404 A1 | 1/1991 |
| RU | 33020 U1 | 10/2003 |
| RU | 2228902 C1 | 5/2004 |
| RU | 2414291 C1 | 3/2011 |
| WO | 0130491 A1 | 5/2001 |
| WO | 2013159797 A1 | 10/2013 |
| WO | 2015069357 A2 | 5/2015 |

OTHER PUBLICATIONS

"Nitrogen Dioxide Trends". No Author. Retrieved from https://www.epa.gov/air-trends/nitrogen-dioxide-trends on Feb. 25, 2021.*
Extended European Search Report for EP 16735543.7 dated Jul. 17, 2018.
International Search Report and Written Opinion for PCT/US2016/012852, dated Mar. 29, 2016.
Gad, "Nickel Chloride", Encyclopedia of Toxicology, Second Edition (2005), pp. 223-225.

* cited by examiner

*Primary Examiner* — Peter F Godenschwager
(74) *Attorney, Agent, or Firm* — DLA Piper LLP (US)

(57) ABSTRACT

Adsorbents including a sorbent, at least one metal additive and greater than about 5 wt. % triethylenediamine are described herein. Methods for making such adsorbents and filters comprising the adsorbents are also described.

8 Claims, 1 Drawing Sheet

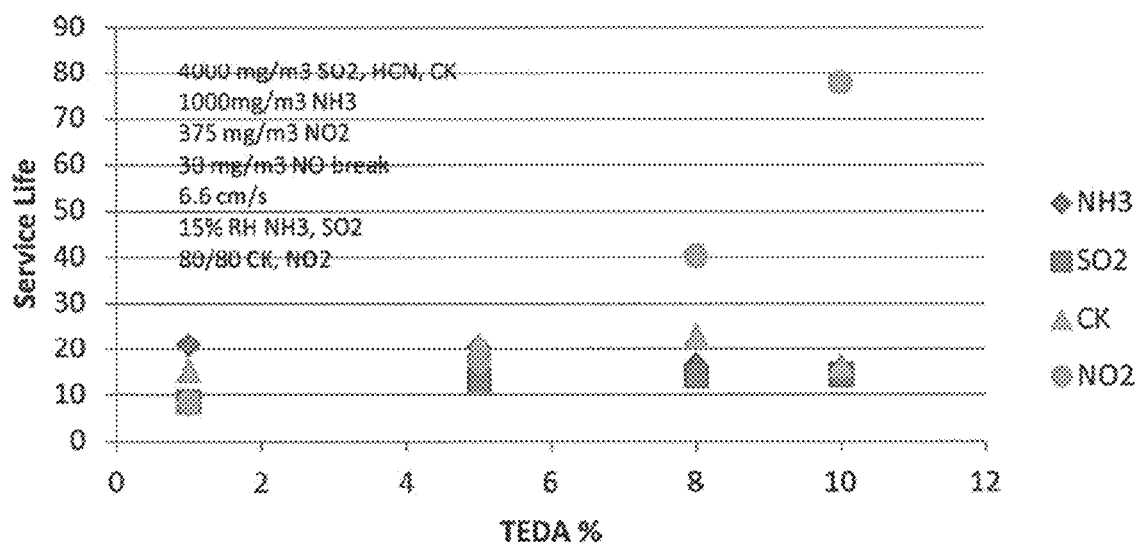

CARBON SORBENTS FOR THE REMOVAL OF NITROGEN OXIDES AND METHODS FOR MAKING THE SAME

CROSS-REFERENCE TO RELATED APPLICATIONS

This application is a continuation application of U.S. Non-Provisional application Ser. No. 14/992,554, entitled "Carbon Sorbent for the Removal of Nitrogen Oxides and Methods for Making the Same" filed on Jan. 11, 2016, which claims priority from U.S. Provisional No. 62/101,622, entitled "Carbon Sorbents for the Removal of Nitrogen Oxides and Methods for Making the Same" filed on Jan. 9, 2015, the contents of which are incorporated by reference in their entirety.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Activated carbon has long been used to remove toxic gases and vapors from a stream of gas or liquid. For example, activated carbons are also useful for removing noxious agents from breathing air or exhaust gases and can be used in gas mask filters, respirators, collective filters, and other applications. Activated carbons used to remove noxious agents are often impregnated with components that react with noxious gases that would otherwise not be removed through the use of unimpregnated activated carbons. Chemical adsorption reactions with impregnants on the activated carbon render noxious gasses as inert or convert them to a form that is more readily removed by the carbon. In particular, nitrogen dioxide and related nitrogen oxides ($NO_x$) are poisonous gases that must be removed from breathing air or exhaust gases. Previous adsorbents have used various carbon-based and non-carbon-based sorbents with high costs and low effectiveness.

Further, the use of triethylenediamine (TEDA) in respiratory filters and sorbent media designed to provide respiratory protection against military gases has long been recognized. In particular, TEDA is accepted as a critical material in providing protection against cyanogen chloride (CK) gas in chromium-free compositions, which may also contain copper and in some cases zinc. There is a desire to improve NO2 removal for many respirator and air purification applications.

SUMMARY OF THE INVENTION

Not applicable

DESCRIPTION OF DRAWINGS

FIG. 1 illustrates the effect of triethylenediamine on the removal of noxious gases from streams of gas.

DETAILED DESCRIPTION

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a combustion chamber" is a reference to "one or more combustion chambers" and equivalents thereof known to those skilled in the art, and so forth.

As used herein, the term "about" means plus or minus 10% of the numerical value of the number with which it is being used. Therefore, about 50% means in the range of 45%-55%.

As used herein, the term "sorbent material" is meant to encompass all known materials from any source. For example, sorbent materials include, but are not limited to, activated carbon, natural and synthetic zeolite, silica, silica gel, alumina, zirconia, and diatomaceous earths.

Various embodiments of the invention are directed to adsorbents for removal of noxious or toxic gases from air or other gas streams. Other embodiments are directed to methods for producing such adsorbents and filter apparatuses including these adsorbents.

The adsorbents of various embodiments include a sorbent material with a combination of additives including greater than 5% triethylenediamine (TEDA) to improve adsorption of various toxic gases. In particular, the adsorbents of the invention provide improved adsorption of nitrogen containing gases such as, nitrogen dioxide and other nitrogen oxides. The adsorbents of various embodiments can include additional additives that improve adsorption of nitrogen containing gases or other harmful or toxic gases. These additional additives can include, for example, metals or combinations of metals, sulfates, and the like. For example, in certain embodiments, the adsorbent may at least include copper, zinc, molybdenum, silver, sulfate, and from about 5 wt. % to about 20 wt. % TEDA.

The amount of TEDA included in the adsorbents of embodiments can vary. For example, in some embodiments, the adsorbent may include about 5 wt. % to about 20 wt. % TEDA. In other embodiments, the adsorbent may include from about 6 wt. % to about 15 wt. %, about 8 wt. % to about 10 wt. %, about 10 wt. % to about 20 wt. %, about 10 wt.

% to about 15 wt. %, about 10 wt. % to about 12 wt. %, or any range or individual concentration encompassed by these ranges. The TEDA may be deposited onto the surface of the adsorbent, incorporated into the adsorbent as individual granules, or combinations thereof.

Various additional additives may also be included in the adsorbents of various embodiments. In particular embodiments, the additional additives may be metals or various metal salts or compounds. The use of the term "metals" is intended to include both the metallic form, as well as salts of that metal. For example, the term "copper" is taken to include the possibility of both metallic copper, as well as any of a number of copper salts or compounds. Although various metals may be incorporated into the adsorbents of the invention, in certain embodiments, the metals may include copper, silver, zinc, vanadium, tungsten, molybdenum, silver, and the like. The amount of each metal incorporated into the adsorbents of the invention can vary and can be from about 0.01 wt. % to about 20 wt. % depending on the metal and the gases to be adsorbed. In some embodiments, the adsorbent may include about 2 wt. % to about 12 wt. % for each of copper, zinc, vanadium, tungsten, and molybdenum individually, and in other embodiments, the adsorbent may include about 3 wt. % to about 10 wt. % or about 4 wt. % to about 8 wt. % for each of copper, zinc, vanadium, tungsten, and molybdenum individually or any range or individual concentration encompassed by these ranges. In the adsorbents of embodiments, the concentration of each metal is independent of the other metals in the adsorbent. For example, in some embodiments, the adsorbents may include about 1 wt. % to about 12 wt. % or about 2 wt. % to about 10 wt. % copper, about 0.5 wt. % to about 5 wt. % or about 1 wt. % to about 4 wt. % vanadium, tungsten, molybdenum, or combination thereof, and about 0.01 to about 1.0 wt. % or about 0.03 wt. % to about 0.05 wt. % silver.

Further additives that can be incorporated into the adsorbents of the invention include sulfates, phosphates, carbonates, and the like and combinations thereof. The concentration of sulfate, phosphate, and carbonate can vary among embodiments and is typically between about 1 wt. % to about 10 wt. %, about 2 wt. % to about 8 wt. %, about 3 wt. % to about 5 wt. % or any range or individual concentration encompassed by these ranges.

Embodiments are not limited to any particular sorbent material. For example, the sorbent material may be any of activated carbon, reactivated carbon, natural and synthetic zeolite, silica, silica gel, alumina, diatomaceous earths, zirconia and the like and combinations thereof. In certain embodiments, the sorbent material may be an activated carbon or reactivated carbon. In such embodiments, the activated carbon may be obtained from any source and can be made from a variety of starting materials. For example, suitable materials for production of activated carbon include, but are not limited to, coals of various ranks such as anthracite, semi-anthracite, bituminous, sub-bituminous, brown coals, or lignites; nutshells, such as coconut shell; wood; vegetables such as rice hull or straw; residues or by-products from petroleum processing; and natural or synthetic polymeric materials. The carbonaceous material may be processed into carbon adsorbents by any conventional thermal or chemical methods known in the art and will inherently impart different surface areas and pore volumes depending on the starting materials and processing used. In particular embodiments, the activated carbon may be a coal based activated carbon, and in some embodiments, the starting material may be bituminous coal.

The adsorbents of various embodiments may further include up to about 25 wt. % residual water, and in some embodiments, such adsorbents may include about 2 wt. % to about 20 wt. %, about 3 wt. % to about 15 wt. %, about 4 wt. % to about 10 wt. %, about 4 wt. % to about 8 wt. %, about 6 wt. % to about 9 wt. % residual water, or any individual concentration or range encompassed by these example concentrations. In other embodiments, the adsorbents of the invention may include no (0 wt. %) residual water.

Particular embodiments are directed to adsorbents including activated carbon having a combination of copper, molybdenum, silver, sulfate, and TEDA with each component at any concentration or combination of ranges identified above deposited on the surface of the activated carbon. In some embodiments, the adsorbent may include activated carbon and about 2 wt. % to about 10 wt. % copper, about 1 wt. % to about 4 wt. % molybdenum, about 0.03 wt. % to about 0.1 wt. % silver, about 3 wt. % to about 5 wt. % sulfate, and about 6 wt. % to about 12 wt. % or about 8 wt. % to about 12 wt. % TEDA.

Further embodiments are directed to compositions that include the sorbents described above having a combination of copper, molybdenum, silver, sulfate, and TEDA with each component at any concentration or combination of ranges identified above deposited on the surface of the activated carbon and one or more other sorbent. In such embodiments, the other sorbent may be activated carbon or another sorbent material which can be impregnated with a different combination of additives. For example, in some embodiments, the sorbent described above can be combined with a sorbent for removal of ammonia such as activated carbon impregnated with nickel chloride ($NiCl_2$). In another embodiment, the sorbent may be impregnated with a $NiCl_2/ZnCl_2$ mixture for the removal of ammonia. In other embodiments, the sorbent may be impregnated with one or more of phosphoric acid, sulfuric acid and citric acid for removal of ammonia. The compositions of embodiments may include a blend of the sorbent of the invention and one or more other sorbent, in which the various sorbents are substantially uniformly mixed. Such blended materials can include any ratio of the sorbent of the invention to the one or more other sorbent. For example, the components may be provided in a ratio of about 90:10 to about 50:50 sorbent of the invention to other sorbent. In other embodiments, the combination of sorbents can be layered.

The adsorbents described above can be used to adsorb or otherwise remove various toxic or noxious gases and organic vapors from streams of gas such as, for example, air. A wide variety of toxic or noxious gases can be removed by these sorbents such as, for example, HCN, CNCl, $H_2S$, $Cl_2$, $SO_2$, NO, $NO_2$ formaldehyde, and $NH_3$. In some embodiments, the toxic or noxious gas may be a nitrogen oxide ($NO_x$), such as, for example, $NO_2$. Similarly, various organic vapors such as, for example, $CCl_4$, benzene, toluene, acetone, organic solvents, and the like can be adsorbed by the adsorbents described above. Therefore, in some embodiments, the adsorbents can be provided in fixed beds through which streams of gas that include or, potentially include, toxic or noxious contaminant gases are passed. In other embodiments, the adsorbents can be contained within a housing that is attached to, for example, respirators, gas masks, compressed breathing air devices, and the like through which gas streams including potentially toxic or noxious contaminates are passed.

Such metals can be provided in a variety of forms, for example, the metal may be provided as metal carbonates, metal oxides, metal chlorides, metal halides, metal oxoacids, metal salts, metal sulfates, and the like and combinations thereof. In some embodiments, the adsorbent may additionally include non-metal additives such as, for example, triethylenediamine (TEDA), non-metal phosphates, non-metal sulfates, non-metal carbonates, and the like and combinations thereof.

Certain embodiments are directed to methods for making the adsorbents described above. In some embodiments, the methods may include one or more steps of impregnating a sorbent with an additive. The step of impregnating is well known in the art and can be carried out in any number of ways. Typically, impregnating includes the step of contacting an adsorbent, by immersion or other means, with an impregnation solution containing one or more additives that are dissolved or dispersed in the impregnation solution. The impregnating solution may include one or more additives that will become associated with the adsorbent while the adsorbent is in contact with the impregnating solution. Impregnating can be carried out in one or more impregnating steps. For example, in some embodiments, all of the additives incorporated onto the adsorbent may be included in the impregnating solution such that all of the additives can become associated with the adsorbent in a single impregnating step. In other embodiments, the impregnating solution may include a single additive and a separate impregnating step may be necessary for each additive incorporated onto the adsorbent. In still other embodiments, impregnating can be carried out by impregnating with a first impregnating solution including two or more additives and impregnating with a second impregnating solution including one or more additives. In yet other embodiments, impregnating can be carried out using three or more impregnating steps in which each impregnating solution includes one, two, three, four, or more additives.

The additives used in such methods may be any of the sorbents described above. In particular embodiments, the additives may be at least one metal additive, such as, for example, a metal salt. The metal salt may be salts of copper (II), salts of zinc, salts of molybdenum (VI), salts of silver, or combinations thereof. In further embodiments, the additives may be salts of copper (II), salts of molybdenum (VI), salts of silver, and sulfate. In certain embodiments, the liquid portion of the impregnating solution in which the additives are dissolved or dispersed may be water. In other embodiments, the liquid portion of the impregnating solution may be an aqueous solution of water and a secondary component provided to aid dissolution of the additive into the impregnating solution. For example, in some embodiments, the impregnating solution may be a solution of metal salts or an aqueous solution containing metal salts that has been created by adding, for example, ammonia and/or ammonium carbonate, to the impregnating solution. The ammonia can aid in the dissolution of basic additives such as, for example, copper (II) carbonate ($CuCO_3$) or basic copper carbonate which are essentially insoluble in water.

In particular embodiments, metal additives may be metal salts provided as salts of copper (II), salts of zinc, salts of molybdenum (VI), salts of silver, or combinations thereof. In various embodiments, copper may be provided as, for example, $CuCO_3$, $CuSO_4$, $CuO$, or $Cu[MoO_4]$, and the like or equivalents thereof, silver may be provided as, for example, $AgNO_3$, $AgCO_3$, $AgSO_4$, $AgO$, or $Ag[MoO_4]$ and zinc may be provided as $ZnCO_3$, $ZnSO_4$, $ZnO$, or $Zn[MoO_4]$, and the like or equivalents therefore. Molybdenum can be provided as any of a variety of complex molybdates, such as mono- or di- or heptamolybdate ($[MoO_4]^{-2}$, $[Mo_2O_7]^{-2}$, $[Mo_7O_{24}]^{-6}$) containing compounds such as, for example, ammonium dimolybdate (($NH_4)_2Mo_2O_7$) ammonium heptamolybdate and the like or equivalents thereof. Sulfate ($SO_4^{2-}$) can be provided as copper, silver, or zinc sulfate ($CuSO_4$, $Ag_2SO_4$, $ZnSO_4$) or as, for example, ammonium sulfate (($NH_4)_2SO_4$), sulfuric acid or equivalents thereof, and the like, and combinations thereof.

The methods of some embodiments may include the step of drying the activated carbon after impregnating. Drying is typically carried out after impregnating and/or between impregnating steps when the methods include more than one impregnating step. Drying can be carried out by any means, and in some embodiments, drying can be carried out in an oven, kiln, or fluid bed. In certain embodiments, the methods may include the step of moisturizing the dried activated carbon. Moisturizing can be carried out by any means including, for example, spraying water onto the adsorbent. In some embodiments, moisturizing results in an adsorbent having a moisture content up to about 25%, and in other embodiments, moisturizing may result in an adsorbent having a moisture content of about 2% to about 10%. In further embodiments, moisturizing results in an adsorbent having a moisture content of about 4% to about 8%.

TEDA may be applied by any means well known in the art, such as, for example, admixing TEDA with the dried impregnated sorbent and then sublimation of the TEDA onto the surface of the dried impregnated adsorbent.

Additional embodiments are directed to filters for purifying streams of gas using the sorbents described above. Such embodiments are not limited to particular types of filters. In some embodiments, the filter may be an air filter for civilian or military applications, for example, a personal protection gas mask filter, first responder mask filter, or collective protection filter. In other embodiments, the filter may be an air filter for industrial applications such as, for example, automotive cabin air purification systems.

The filters of various embodiments may have any design and may at least include a housing, including a compartment configured to hold granulated activated carbon and allow streams of gas to flow over or through the activated carbon. Such filters may include various additional components such as, for example, screens or other means for holding the activated carbon in the compartment or additional purification devices such as filtration membranes, particulate filters, and the like. In some embodiments, the housing may include various components necessary to allow the filter to be integrated into a device such as respirators, gas masks, or compressed breathing air devices in which streams of gas flow from one compartment to another and pass through the filter during transfer. The filter may be integrated into a device that attaches to an automotive cabin air inlet that causes streams of gas to pass through the filter before being expelled from the automotive cabin air outlet into the automotive cabin area. In particular, the filter may include an inlet port for introducing streams of gas into the filter and an outlet port for dispensing the filtered streams of gas from the filter. In some embodiments, the filter may include a removable connecting means to connect to a gas source such as a pipe, hose, tube fittings, and the like at the inlet port.

In some embodiments, the filter may include a filter housing having an elongated envelope composed of an inert plastic material such as polyethylene, polypropylene, polyvinylchloride, polytetrafluoroethylene, or any combination thereof disposed within the filter housing for retaining the activated carbon. The filter housing and the envelope may be spaced from one another. In some embodiments, a particulate filter such as, for example, filter paper may be disposed within the space to retain dust associated with activated carbon. In particular embodiments, additional adsorbents, such as, carbon cloth may be disposed within the space. In some embodiments, the filter may include a perforated plate, slotted grate, mesh grill, screen, or other means for securing the envelope within the housing while allowing free flow of streams of gas through the filter housing.

Industrial or military devices may include larger filter devices designed to attach to large high flow streams of gas that provide beds positioned to receive streams of gas from a contaminated gas source during treatment. Such devices are well known in the art and the activated carbon can be included in any such device. In various embodiments, beds or tanks including granular activated carbon can be positioned at various places along the flow path of the contaminated gas source, and granular activated carbon, as described above, can be used by any one or all of these beds or tanks. In certain embodiments, the streams of gas may be contacted with powdered activated carbon at one or more locations in the flow path. The treatment devices and facilities may include various additional tanks and components.

The filters of the various embodiments described above may include the sorbent of the invention having a combination of copper, zinc, molybdenum, silver, sulfate, and TEDA with each component at any concentration or combination of ranges identified above deposited on the surface of the activated carbon alone. In other embodiments, the filters can include a combination of the sorbent of the invention with one or more other sorbent. Other sorbents can be activated carbon or another sorbent material, and may be unimpregnated or impregnated with a different combination of additives. In some embodiments, the sorbent of the invention and the one or more other sorbent can be blended. In other embodiments, the combination of sorbents can be layered in a filter device.

EXAMPLES

Although the present invention has been described in considerable detail with reference to certain preferred embodiments thereof, other versions are possible. Therefore, the spirit and scope of the appended claims should not be limited to the description and the preferred versions contained within this specification. Various aspects of the present invention will be illustrated with reference to the following non-limiting examples.

Example 1

Samples 2-4 were prepared by impregnating coal-based activated carbon (12×30 mesh U.S.) in a solution containing salts of copper (II), salts of molybdenum (VI), salts of silver, and sulfate. The activated carbon was dried by passing through a fluid bed drier. It was subsequently resized to provide a 20×40 mesh material. The material was moisturized by spraying with water for a moisture content of about 6.0%. Triethylenediamine (TEDA) was added by sublimation to the impregnated activated carbon. Each of the Samples 2-4 were prepared with 8.4 w/w % copper, 1.9 w/w % molybdenum, 2.9 w/w % sulfate, 0.03 w/w % silver and 6.0 w/w % water with varying TEDA content. Sample 1 was prepared from a pool of carbon with a similar composition as Samples 2-4, and having 1 w/w % TEDA. The TEDA content for Samples 2-4 were as follows: Sample 2 had 5 wt. % TEDA, Sample 3 had 8 wt. % TEDA, and Sample 4 had 10 wt. % TEDA.

Portions of each of the samples were placed into sample tubes as 1.0 cm beds and exposed to individual challenges of 4000 mg/m$^3$ of sulfur dioxide ($SO_2$), hydrogen cyanide (HCN), cyanogen chloride (CK), 1000 mg/m$^3$ ammonia ($NH_3$), and 375 mg/m$^3$ nitrogen dioxide ($NO_2$), at a linear velocity of 6.6 cm/s. Breakthrough levels were as follows: 5 mg/m3 $SO_2$; lesser of (4 mg/m$^3$ HCN or 8 mg/m$^3$ $(CN)_2$) for HCN; 8 mg/m$^3$ CK; 35 mg/m$^3$ $NH_3$; lesser of (9 mg/m$^3$ $NO_2$ or 30 mg/m$^3$ NO) for $NO_2$. $SO_2$ and $NH_3$ testing was performed on as-received samples under conditions of 15% relative humidity. Testing for CK and $NO_2$ was performed at 80% RH on samples that had been previously equilibrated in a stream of 80% RH air at 25 C for 16 hours. The samples were evaluated to determine the breakthrough times of various noxious or toxic gases ($NH_3$, $SO_2$, CK, and $NO_2$) measured in minutes. FIG. 1 shows that samples 1 and 2 had breakthrough times of 21 minutes or less for $NH_3$, $SO_2$, CK, and $NO_2$, but samples 3 and 4 had $NO_2$ breakthrough times of 40 minutes and 78 minutes, respectively. The $NO_2$ breakthrough times for samples 3 and 4 were improved in comparison to samples 1 and 2. Table 1 below illustrates the comparison of breakthrough times for $SO_2$, $NH_3$, CK and $NO_2$ with the w/w % TEDA in each of the four samples.

TABLE 1

| Sample | TEDA | $SO_2$ | $NH_3$ | CK | $NO_2$ |
|---|---|---|---|---|---|
| 1 | 1 | 9 | 21 | 15 | 8 |
| 2 | 5 | 13 | 20 | 21 | 17 |
| 3 | 8 | 14 | 17 | 23 | 40 |
| 4 | 10 | 14 | 15 | 24 | 78 |

Example 2

Sample 3 of Example 1 was blended in an 80/20 w/w ratio with a carbon that had been impregnated with $NiCl_2$, a material known to be particularly effective for removal of ammonia, producing Sample 5. Breakthrough tests were then conducted under the same conditions, and the results are set forth in Table 2.

TABLE 2

| Sample | TEDA | $SO_2$ | $NH_3$ | CK | $NO_2$ |
|---|---|---|---|---|---|
| 5 | 8 | 13.0 | 30.3 | 16.4 | 32.0 |

This data shows the advantages of improved $NO_2$ performance were largely retained, while desirable ammonia performance was significantly improved.

Example 3

A 1.0 cm depth of samples 3 and 4 of Example 1 were loaded into testing columns with 0.2 cm of the $NiCl_2$-impregnated carbon in a layered configuration, with the ammonia-specific material being placed on the exit layer, Samples 6 and 7, respectively. The packed tubes were then tested as above at a 1.2 cm bed depth. Breakthrough times as a function of TEDA content for various gases is set forth in Table 3 below.

TABLE 3

| Sample | TEDA | SO$_2$ | NH$_3$ | CK | NO$_2$ |
|---|---|---|---|---|---|
| 6 | 8 | 19.0 | 36.9 | 23.8 | 41.0 |
| 7 | 10 | 16.6 | 34.8 | 23.3 | 77.5 |

The data shows the benefits of combining an ammonia-specific carbon with the improved NO$_2$ performance of Samples 6 and 7 versus samples 3 and 4 which did not contain the NiCl2 layer.

What is claimed is:

1. A method of removing NO$_2$ from a gas stream that includes toxic or noxious amounts of NO$_2$, the method comprising:
    contacting a composition with the gas stream that includes toxic or noxious amounts of NO$_2$, said composition comprising a first sorbent having a first surface deposition comprising:
        about 2 wt. % to about 12 wt. % copper;
        about 1 wt. % to about 5 wt. % molybdenum;
        about 3 wt. % to about 6 wt. % sulfate;
        about 8 wt. % to about 15 wt. % triethylenediamine;
    wherein the contacting causes the composition to remove the toxic or noxious amounts of NO$_2$ from the gas stream.

2. The method of claim 1, wherein the first surface deposition further comprises about 2 wt. % to about 12 wt. % zinc.

3. The method of claim 1, wherein the first surface deposition further comprises about 0.03 wt. % to about 1.0 wt. % silver.

4. The method of claim 1, the first surface deposition comprising about 6 wt .% to about 15 wt. % triethylenediamine.

5. The method of claim 1, the first surface deposition comprising about 8 wt. % to about 10 wt. % triethylenediamine.

6. The method of claim 1, the first surface deposition comprising about 8 wt. % to about 10 wt. % triethylenediamine.

7. The method of claim 1, wherein the composition further comprises a second sorbent for removal of ammonia.

8. The method of claim 1, further comprising providing the composition within a filter, and the filter includes an air filter for civilian or military applications, a personal protection gas mask filter, a first responder mask filter, a collective protection filter, an air filter for industrial applications, or a filter for automotive cabin air purification.

* * * * *